Aug. 9, 1927. Re. 16,694
J. N. HELTZEL
EXPANSION PEDESTAL
Original Filed May 16, 1923 3 Sheets-Sheet 1
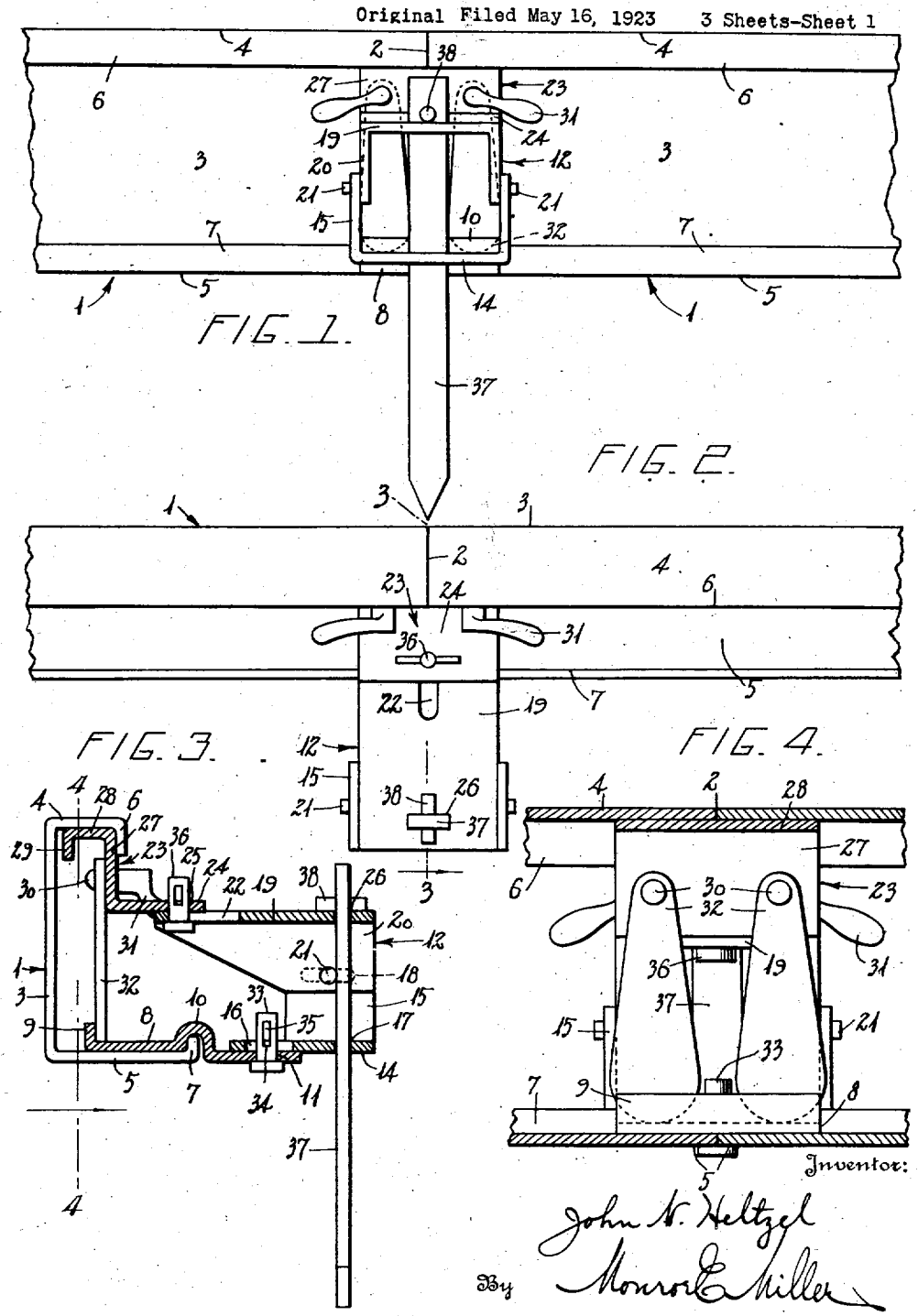
Inventor:
John N. Heltzel
By Monroe E. Miller
Attorney.

Aug. 9, 1927. J. N. HELTZEL Re. 16,694
EXPANSION PEDESTAL
Original Filed May 16, 1923 3 Sheets-Sheet 2
FIG. 8.
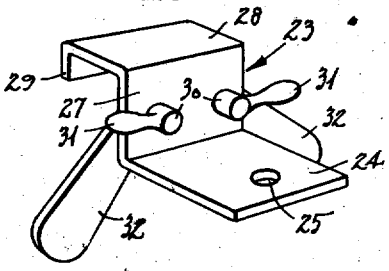
FIG. 7.
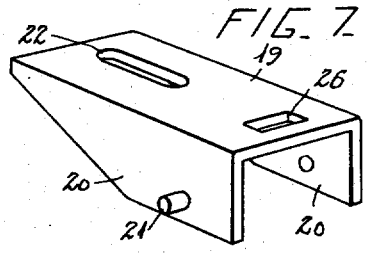
FIG. 5.
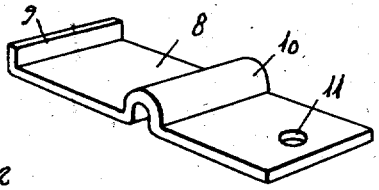
FIG. 6.
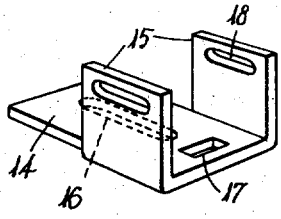
FIG. 9.
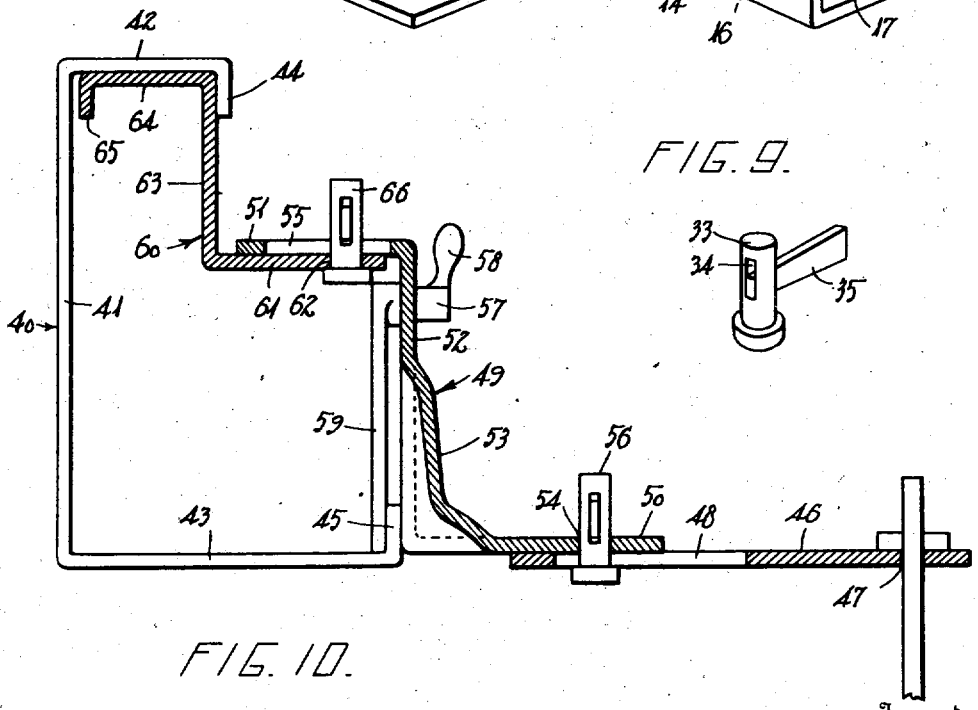
FIG. 10.
Inventor:
John N. Heltzel
By Monroe E. Miller
Attorney.

Aug. 9, 1927. J. N. HELTZEL Re. 16,694

EXPANSION PEDESTAL

Original Filed May 16, 1923 3 Sheets-Sheet 3

Inventor:
John N. Heltzel
By Monroe C. Miller
Attorney.

Reissued Aug. 9, 1927. Re. 16,694

UNITED STATES PATENT OFFICE.

JOHN N. HELTZEL, OF WARREN, OHIO.

EXPANSION PEDESTAL.

Original No. 1,488,638, dated April 1, 1924, Serial No. 639,426, filed May 16, 1923. Application for reissue filed December 17, 1925. Serial No. 76,131.

The device forming the subject matter of this application is adapted to be employed for connecting at their ends, alining rails of the sort which are used commonly in forming a curb or shoulder of concrete or the like, at the edge of a roadway.

Th invention aims to provide novel means whereby the ends of the rails may be connected securely but releasably.

It is another object of this invention to provide means whereby one of two abutting rail ends may be securely but releasably held, independently of the other.

A further object of the invention is to supply a novel supporting device, which, being expanded within the abutting end portions of a pair of rails, will hold the rails securely in position.

A further object of the invention is to provide novel means whereby a lateral or horizontal adjustment of the rails may be secured, and to afford novel means whereby the device may be adjusted horizontally or laterally to accommodate rails of varying dimensions.

A further object of the invention is to provide an expansible supporting or connecting device which may be shifted along from place to place and be expanded within the rails, at points intermediate the ends of the rails, to hold the rails in an upright position.

The invention aims, further, to so construct the device that the desired adjustments may be secured, even though the holding stake have been driven into the ground.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention, assembled with a pair of abutting rails;

Fig. 2 is a top plan of the structure delineated in Fig. 1;

Fig. 3 is a section on the line 3—3 of Fig. 2;

Fig. 4 is a section on the line 4—4 of Fig. 3;

Fig. 5 is a perspective showing the base;

Fig. 6 is a perspective showing the lower member of the expansible support;

Fig. 7 is a perspective showing the upper member of the expansible support;

Fig. 8 is a perspective showing the head piece and the cams;

Fig. 9 is a perspective disclosing one of the connecting elements;

Fig. 10 is a vertical sectional view disclosing a modified form of the invention;

Figure 11:
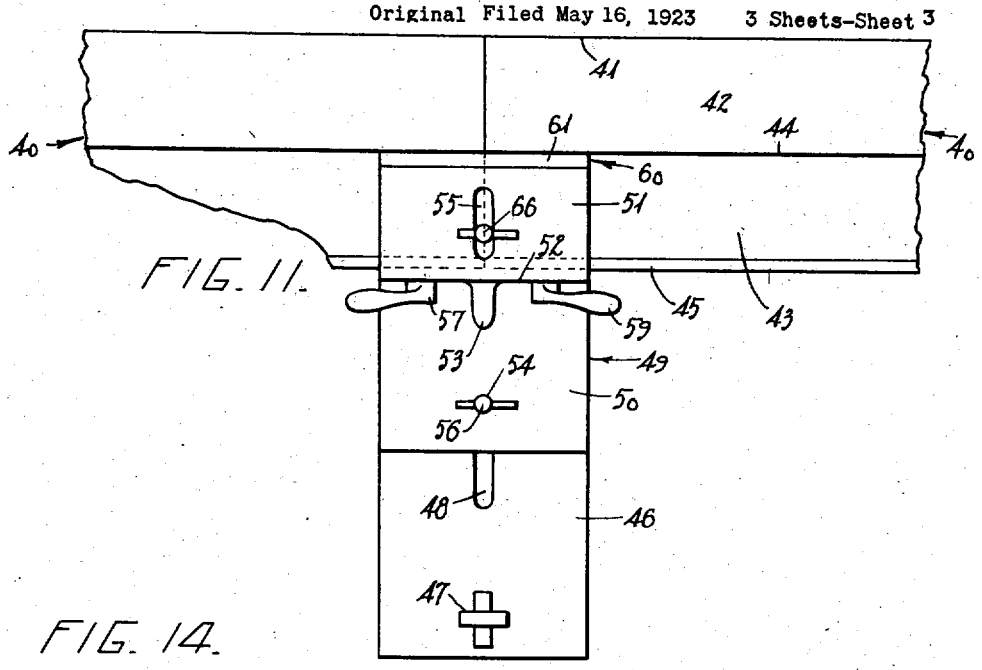
Fig. 11 is a top plan of the structure delineated in Fig. 10.

In carrying out the invention as shown in Figs. 1, 2 and 3, recourse is had to a pair of rails 1, substantially channel-shaped and abutting at their ends, as at 2, the rails being of the general sort used for forming a curb or shoulder of concrete or like material along a highway. Each rail 1 includes an upright wall or web 3, a top or tread flange 4, and a bottom or base flange 5, the top flange having a depending lip or secondary flange 6 and the bottom flange having an upstanding lip or secondary flange 7.

The device which is used to connect the rails 1 embodies a base 8, in the form of a plate, provided with an upstanding flange 9 at its inner end, and a transverse upwardly offset seat 10 between its ends, and an opening 11 adjacent to its outer end. The plate 8 rests on the bottom flanges 5 of the rails 1 and extends across the abutting ends of the rails, the upstanding lips or flanges 7 being received in the seat 10.

An expansible connecting device 12 is provided, including a lower member 14 having upstanding ears or flanges 15, and an upper member or plate 19 having depending ears or flanges 20 overlapping the ears 15. There is an elongated slot 16 in the member of plate 14, and said member is provided near its outer end with an opening 17, the ears 15 having horizontal slots 18. The member or plate 14 overlaps the outer end portion of the base 8. A clamping and pivot element or pin 33 extends through the opening 11 and slot 16 and has a lower head bearing upwardly against the base 8. The pin 33 has a slot 34 through which is inserted a wedge-shaped key 35 adapted, when driven into the slot, to bear on the member 14 and clamp the member 14 on the base 8. The ears or flanges 20 of the upper member 19 have pivot elements 21 movably received in the slots 18 in order to pivotally and slidably connect the upper and lower members 19 and 14 respectively.

A head piece 23 has a flange 24 with an opening 25, an upstanding portion 27, a top portion 28 and a depending flange or lip 29. Shafts 30 are journaled in the portion 27 and have handles or levers 31 at their outer ends, and carry cams 32 at their inner ends. The flange 24 overlaps the member or plate 19, and a clamping and pivot element or pin 36, similar to the pin 33, is inserted through the opening 25 and an elongated slot 22 with which the member 19 is provided for clamping the flange 24 and member 19 together. The portion 27 bears against the lips 6 of the rails and the top portion 28 bears upwardly against the flanges 4.

A stake 37 is inserted downwardly through an opening 26 in the member 19 at the outer end thereof and through the opening 17, and has a stop 38 to contact with the member 19. The members 14 and 19 being pivotally connected, and the base 8 and head piece 23 being secured to the members 14 and 19, respectively, enable the base 8 and head piece 23 to be swung apart so as to bear against the flanges 5 and 4, respectively. The shafts 30 are then turned by means of the handles or levers 31, and the cams 32 bearing on the base 8 in overlapping relation with the flange 9 will forcibly separate the base 8 and head piece 23 to clamp them tightly against the flanges 5 and 4, respectively. The parts of the device being constructed of metal are resilient, and when one of the cams 32 is disengaged from the base 8, the corresponding rail 1 will be set free, while the other rail is held. The slots 16, 18 and 22 in which the pivot elements 33, 21 and 36, respectively, are disposed, permit of lateral adjustment of the parts relatively to one another, to accommodate rails of different dimensions and to permit of adjustments after the stake 37 has been driven down through the openings 26 and 17 into the ground. The members 14 and 19 provide a stake socket to receive the stake, as well as providing a hinge or adjustable connection between the base 8 and head piece 23, and said members 14 and 19 are adjustable relatively to the base 8 and head piece 23 to enable adjustment to be made before and after the stake is driven into place. The members 14 and 19 may also be slid relatively to one another because of the provision of the slots 18, so that the stake 37 may be either vertical or inclined, and the base 8 and head piece 23 may also be adjusted individually with reference to the members 14 and 19. This provides a wide range of adjustments for rails of different dimensions, and to permit the rails to be positioned after the stake is in place. The cams 32 separating the base 8 and head piece 23 will also clamp the device securely within the end portions of the rails to serve as a rail joint.

Figure 14:
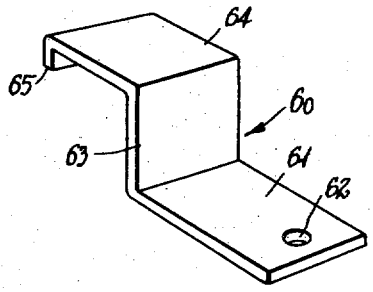
Fig. 14 is a perspective showing the head piece.
Figure 13:
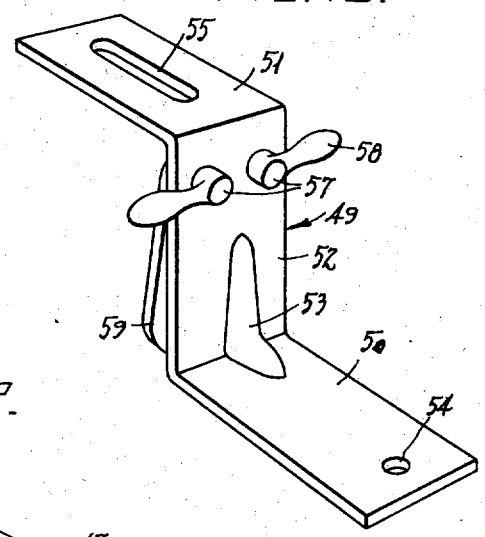
Fig. 13 is a perspective showing the connecting and supporting member.
Figure 12:
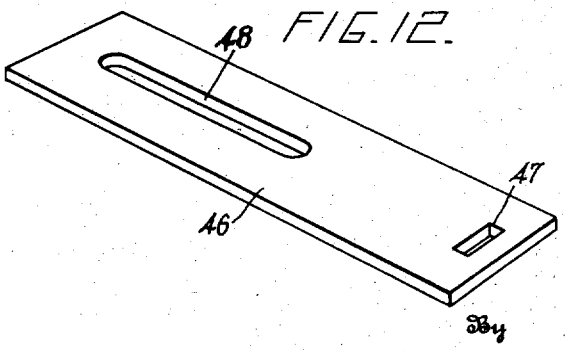
Fig. 12 is a perspective wherein the base is shown.

Passing to the modified form of device shown in Figs. 10 to 14, each rail 40 has the upright wall or web 41, a top flange 42, and a bottom flange 43, as hereinbefore described, the top flange 42 having a depending lip 44 and the bottom flange 43 having an upstanding lip 45.

The base 46 is in the form of a plate, having an opening 47 near its outer end and an elongated slot 48.

The connecting device, indicated generally by the numeral 49, includes a lower member 50 and an upper member 51 connected by a web or standard 52, the member or flange 50 projecting outwardly and the member or flange 51 projecting inwardly, and there being a reinforcing buttress 53 between the web 52 and member 50. There is an opening 54 in the member 50, and the upper member 51 is supplied with an elongated slot 55. The lower member 50 overlaps the base 46, and a clamping and pivot element 56, similar to pins 33 and 36, extends through the opening 54 and slot 48 for clamping the member 50 and base 46 together. Shafts 57 are journaled in the web or standard 52 and have handles 58 and cams 59 at the outer and inner sides of the standard. The standard 52 bears against the outer sides of the lips 45, and the cams 59 overlap the inner sides of said lips and bear on the bottom flanges 43, as seen in Fig. 10.

The head piece 60 similar to the head piece 23 hereinbefore described, includes a flange 61 having an opening 62, an upstanding portion 63, a top portion 64 and a depending flange 65. The flange 61 extends under the member 51 and a combined clamping and pivot element 66, similar to the pin 33, extends through the opening 62 and slot 55 for clamping the member 51 and flange 61 together. The portion 63 overlaps the lips 44 at the inner side thereof, and the portion 64 bears upwardly against the flanges 42. When the shafts 57 are turned, the cams 59, bearing on the flanges 43, will force the head piece 60 upwardly against the flanges 42, so as to hold the rails together in abutment. Either cam 59 may be turned, to release or remove the corresponding rail, while the other rail is held securely. The stake is driven through the slot 47 of the base 46, and the slots 48 and 55 permit of relative lateral adjustments of the several parts before and after the stake is driven through the opening 47.

Having thus described the invention, what is claimed as new is:—

1. In a structure of the class described, a base, cooperating elements comprising a supporting member and a head piece, the supporting member being overlapped on the base, and the head piece being overlapped on the supporting member, a rail-engaging clamping device movably mounted on one of said cooperating elements, means for connecting the head piece to the supporting member for horizontal adjustment, and means for connecting the supporting member to the base for horizontal adjustment.

2. In a structure of the class described, a base, cooperating elements comprising a supporting member and a head piece, the supporting member being overlapped on the base, and the head piece being overlapped on the supporting member, a rail-engaging clamping device movably mounted on one of said cooperating elements, means for connecting the head piece to the supporting member, and means for connecting the supporting member to the base for horizontal adjustment.

3. In a device of the class described, a base, cooperating elements comprising a supporting member and a head piece, the supporting member being overlapped on the base, and the head piece being overlapped on the supporting member, a rail-engaging clamping device movably mounted on one of said cooperating elements, means for connecting the head piece to the supporting member for horizontal adjustment, and means for connecting the supporting member to the base.

4. In a structure of the class described, a base, cooperating elements comprising a supporting member and a head piece, the supporting member being overlapped on the base, and the head piece being overlapped on the supporting member, means for connecting the head piece to the supporting member for horizontal adjustment, means for connecting the supporting member to the base for horizontal adjustment, and horizontally spaced, individually operable, rail-engaging clamping devices carried by one of said cooperating elements.

5. In a structure of the class described, cooperating elements comprising a base and a supporting member overlapped thereon, means for connecting the base to the supporting member for horizontal adjustment, a stake extended through one of said cooperating elements, a head piece, means for connecting the head piece to the supporting member for horizontal adjustment, and mechanism for clamping the structure above set forth upon the ends of a pair of abutting rails.

6. In a device of the class described, a base and a head piece, a supporting member connected to the base and the head piece and comprising relatively movable parts, pivot means connecting said parts, and a stake passing through said parts, the stake being located on one side of the pivot means, and the base and the head piece being located on the other side of the pivot means.

7. In a structure of the class described, a base and a head piece, movable clamping means carried by the head piece and engaging the base, a supporting member connected to the base and the head piece and comprising relatively movable parts, a pivot element connecting said parts, and a stake passing through said parts, the pivot element being located between the stake on the one hand, and the base and the head piece on the other hand.

8. In a structure of the class described, a supporting member, comprising relatively movable parts, a pivot element connecting said parts, a base, a head piece, means for connecting the base to one of said parts, for horizontal adjustment, means for connecting the head piece to the other of said parts for horizontal adjustment, and a stake passing through said parts, the pivot element being located between the stake on the one hand, and the base and the head piece on the other hand.

9. The combination with two abutting concrete form rails each having a web, an upper flange with a depending lip, and a lower flange with an upturned lip, of expansible means within the end portions of the rails including a head piece to bear upwardly against the upper flanges of the rails between the webs and depending lips, and a base to bear downwardly on the lower flanges of the rails between the webs and upturned lips, with contacting portions between the head piece and base movable relatively to one another longitudinally of the rails to cause the head piece and base to bear upwardly and downwardly against the upper and lower flanges, respectively.

10. The combination with two abutting concrete form rails each having a web, an upper flange with a depending lip and a lower flange with an upturned lip, of expansible means within the end portions of the rails including a head piece to bear upwardly against the upper flanges of the rails between the webs and depending lips, a base to bear downwardly on the lower flanges of the rails between the webs and upturned lips, and means between the head piece and base for separating them to clamp them against the upper and lower flanges, respectively.

11. The combination with two abutting concrete form rails each having a web, an upper flange with a depending lip and a lower flange with an upturned lip, of expansible means within the end portions of the rails including a head piece to bear upwardly against the upper flanges of the rails between the webs and depending lips, and a base to bear downwardly on the lower flanges of the rails between the webs and upturned lips, with contacting portions between the head piece and base movable relatively to one another longitudinally of the rails to cause the head piece and base to bear upwardly and downwardly against the upper and lower flanges, respectively, said head piece and base being engageable with said lips and being slidable longitudinally along said flanges between the webs and lips so as to permit the rails and said head piece and base to be moved together and separated longitudinally of the rails.

12. A device of the character described comprising a head piece and a base to bear upwardly and downwardly against the upper and lower flanges, respectively, of concrete form rails, and cams between said head piece and base for moving them away from one another to clamp them against said flanges.

13. A device of the character described comprising a base to bear on the lower flanges of concrete form rails, a head piece having a vertical portion and top portion to bear upwardly against the upper flanges of said rails, and cams pivoted to said vertical portion and adapted to bear on said base.

14. A device of the character described comprising expansible means to be disposed within the end portions of two abutting concrete form rails for connecting said rails and having members adapted to bear upwardly and downwardly against the upper and lower flanges, respectively, of both rails, said means having cams between said members for forcing them against said flanges.

15. A device of the character described comprising a member adapted to bear against flanges of concrete form rails, and cams pivotally connected with said member to apply pressure to opposite flanges of the rails and clamp said member against the first named flanges.

16. A device of the character described comprising a head piece to bear upwardly against the upper flanges of concrete form rails, and cams pivotally connected with said member to apply pressure on lower flanges of said rails for clamping said head piece upwardly against the upper flanges.

17. The combination with two abutting concrete form rails each having a web, an upper flange with a depending lip, and a lower flange with an upturned lip, a head piece to bear upwardly against the upper flanges between the webs and depending lips, a base to bear on the lower flanges between the webs and upturned lips, and independently operable means between said head piece and base for clamping same against the flanges of the two rails.

18. The combination with two abutting concrete form rails each having a web, an upper flange and a lower flange, one of said flanges having a lip, a member overlapping the last named flange of each rail between the web and lip, and independent cams between said member and opposite flanges of the rails and pivoted to said member for clamping said member against said flanges having the lips.

19. The combination with two abutting concrete form rails each having a web, an upper flange with a depending lip, and a lower flange, of a head piece to bear upwardly against the upper flanges of the rails between the webs and lips, and independently operable clamping cams between said member and the lower flanges and pivoted to said member.

20. A device of the character described comprising expansible means to be disposed between flanges of a concrete form rail and clamped against said flanges, and a stake-engaging member connected to said means.

21. A device of the character described comprising expansible means to be disposed between flanges of a concrete form rail and clamped against said flanges, and a member connected to said means and having a stake-receiving opening.

22. A device of the character described comprising expansible means to be disposed between flanges of a concrete form rail and clamped against said flanges, a stake, and a connection between said stake and means.

23. A device of the character described comprising expansible means to be disposed between flanges of a concrete form rail and clamped against said flanges, and a stake-engaging member adjustably connected with said means.

24. A device of the character described comprising expansible means to be disposed between flanges of a concrete form rail and clamped against said flanges, and a member adjustably connected with said means and having a stake-receiving opening.

25. A device of the character described comprising expansible means to be disposed between flanges of a concrete form rail and clamped against said flanges, a stake, and an adjustable connection between said means and stake.

26. A device of the character described comprising superposed members having means for engaging a single stake, and means for adjustably connecting said members with a concrete form rail constructed and arranged to permit either member to be adjusted relatively to the rail and to rigidly secure both members to the rail.

27. A device of the character described comprising superposed members having openings for receiving a single stake, and means for connecting said members with a concrete form rail for independent adjustment relatively to the rail and to rigidly secure both members to the rail.

28. A device of the character described comprising a head piece and a base to engage the upper and lower flanges of a concrete form rail, means for clamping said head piece and base against said flanges, a stake, and independent means for connecting said stake with said head piece and base.

29. A device of the character described comprising a head piece and a base to engage the upper and lower flanges of a concrete form rail, means for clamping said head piece and base against said flanges, and independent stake-engaging members connected to said head piece and base.

30. A device of the character described comprising a head piece and a base to engage the upper and lower flanges of a concrete form rail, means for clamping said head piece and base against said flanges, and independent members connected to said head piece and base and having stake-receiving openings.

31. A device of the character described comprising a head piece and a base to bear against the upper and lower flanges, respectively, of a concrete form rail, means for clamping said head piece and base against said flanges, a stake, and independent means adjustably connecting said stake with said head piece and base.

32. A device of the character described comprising a head piece and a base to bear against the upper and lower flanges, respectively, of a concrete form rail, means for clamping said head piece and base against said flanges, and superposed stake-engaging members connected for independent adjustments with said head piece and base.

33. A device of the character described comprising a head piece and a base to bear against the upper and lower flanges, respectively, of a concrete form rail, means for clamping said head piece and base against said flanges, and superposed members having stake-receiving openings and connected with said head piece and base for independent adjustments.

34. A device of the character described comprising a head piece and a base to bear against the upper and lower flanges of a concrete form rail, means between said head piece and base for clamping them against said flanges, and means connecting said head piece and base and having provision for engaging a stake.

35. A device of the character described comprising a head piece and a base to bear against the upper and lower flanges of a concrete form rail, means between said head piece and base for clamping them against said flanges, and means pivotally connecting said head piece and base and having stake-receiving openings.

36. A device of the character described comprising a head piece and a base to bear against the upper and lower flanges of a concrete form rail, adjustably connected stake-engaging members adjustably connected with said head piece and base, and means for clamping said head piece and base against said flanges.

37. A device of the character described comprising a head piece and a base to bear against the upper and lower flanges of a concrete form rail, stake-engaging members having a pivotal and sliding connection and having adjustable connections with said head piece and base, and means between said head piece and base for clamping them against said flanges.

38. A device of the character described comprising a head piece and a base to bear against the upper and lower flanges of a concrete form rail, means pivotally connecting said head piece and base, and means for forcing said head piece and base away from one another to clamp them against said flanges.

39. A device of the character described having upper and lower independently adjustable stake-engaging members and means for securing both members rigidly to a form rail.

40. A device of the character described having upper and lower independently adjustable members provided with stake-receiving openings, and means for connecting said members to a form rail for adjustment to and from the rail and for securing both members rigidly to the rail.

41. A device of the character described comprising a head piece and a base to bear against the upper and lower flanges, respectively, of a concrete form rail and having portions to project from said rail, means for clamping said head piece and base against said flanges, superposed stake-engaging members overlapping said portions, and means for clamping said members to said portions.

42. A device of the character described comprising a head piece and a base adapted to bear against the upper and lower flanges of a concrete form rail, and having portions to extend away from the rail, means for clamping said head piece and base against said flanges, upper and lower adjustably connected stake-engaging members overlapping said portions of the head piece and base, respectively, and means for clamping said members to said portions.

43. A device of the character described comprising a head piece and a base adapted to bear against the upper and lower flanges of a concrete form rail, means for clamping said head piece and base against said flanges, upper and lower members having a pivotal and sliding connection, said members having stake-receiving openings and overlapping said portions of the head piece and base, respectively, and means for clamping said members against said portions.

In testimony whereof I hereunto affix my signature.

JOHN N. HELTZEL.